April 23, 1968 W. BERTRAM 3,379,094
LIGHT METER
Filed May 25, 1964
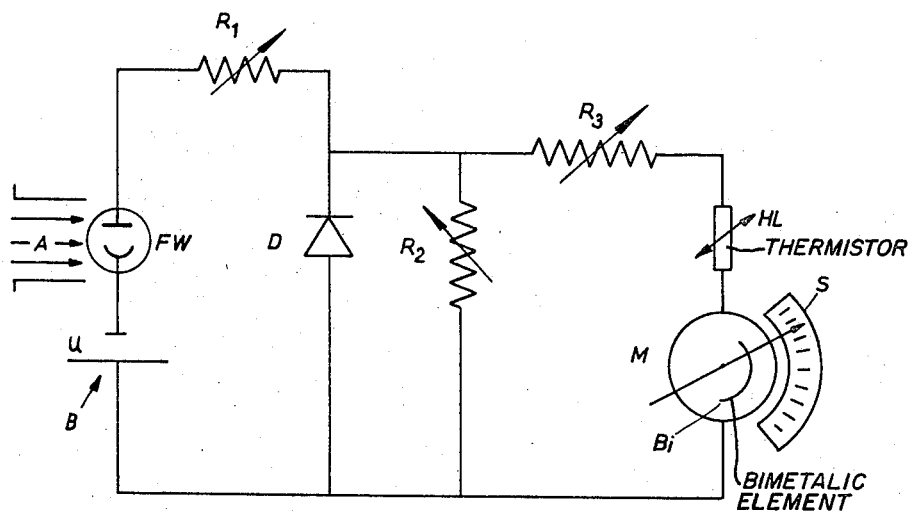
INVENTOR.
WILHELM BERTRAM
BY
ATTORNEYS United States Patent Office 3,379,094
Patented Apr. 23, 1968

3,379,094
LIGHT METER
Wilhelm Bertram, 125 Planegger Strasse,
Munich-Pasing, Germany
Filed May 25, 1964, Ser. No. 369,723
4 Claims. (Cl. 88—23)

ABSTRACT OF THE DISCLOSURE

A light meter device having a battery circuit containing a photo-conductive cell therein. The battery circuit is connected to a network which includes a plurality of parallel branches, one of said branches containing a meter and a resistance connected in series therein. Another of the parallel braches contains a nonlinear resistance element therein for partially equalizing the nonlinearity of the photo-conductive cell. The resistance connected in series with the meter constitutes a thermistor to compensate for the temperature dependency of the nonlinear resistance element. The meter is also provided with a bimetallic biasing means for causing a zero-point shift of the meter at low light intensities.

---

This invention refers to a light meter, with a light-sensitive element comprising a photo-resistance which lies in the battery-fed circuit of a meter or measuring device for indicating the intensity of light incident on the photo-resistance.

The use of a photo-resistance as a light-sensitive element in light meters is advantageous compared to the use of a photo cell insofar as a larger light intensity range can be measured. Photo-resistances, however, have the characteristic that their resistance value is reduced much more than nonlinearly with respect to the logarithm of the increase in light intensity. This fact produces considerable difficulties in the indication by the measuring device which changes its indicator position in a proportionally growing manner with respect to the logarithm of the increase in light intensity.

Previous light meters of the above-defined kind use non-linear scales whose partition becomes wider with the increase in light intensity. This, however, results in scales which within the range of low light intensities are very hard to read and which, for a given total measuring range, must be very large. Thus, in such previous light meters, a constant pre-resistance was connected to the measuring device and the photo-resistance for the purpose of limiting the strength of the current in the circuit of the measuring device upon increasing light magnitude. Furthermore it is also known that a selectively usable, light-reducing filter can be employed in front of the photo-resistance in order to prevent an overly great increase in the reading of the measuring device. But neither of these known measures lead to an even approximately linear relationship between the logarithm of the increase in light intensity of the photo-resistance and the change in position of the measuring device indicator. In order to arrive at an at least somewhat controllable scale, it has in the past been necessary to provide a mechanical equalization curve drive which brings about an approximation to the linear dependence. This makes the construction of a light meter very complicated.

It is the purpose of the present invention to remove these handicaps. This is accomplished by co-ordinating with the circuit of the measuring device a non-linear resistance in such a manner that it results in an at least approximately linear relationship between the logarithm of the increase in light intensity at the photo-resistance and the deflection of the measuring device.

When the function is known, according to which the change of the photo-resistance is dependent on the light intensity, it is easily possible to select a non-linear resistance, i.e. a resistance whose resistance value changes with the magnitude of the current traversing it, with characteristics that make the deflection of the measuring device indicator essentially linear with regard to the logarithm of the increase in light intensity. Thus it becomes possible to use at the measuring device a scale with a linear division which is easily legible even in low light intensities. In addition, a measuring device with a given maximal deflection also puts a large measuring range within reach. A mechanical equalization curve drive for the linearization of the dependence between light magnitude and measuring device deflection is no longer necessary or at least needs only a very simple construction. Drives for transferring the indicator movement of the measuring device to additional computing devices, for instance for the determination of filtering factors or contrast corrections, can also be constructed along very simple lines. Because of the linear dependence of measuring device deflection on the logarithm of the increase in light intensity, the light measuring device can also be constructed very easily in such a manner that it possesses a very great sensitivity over its entire deflection range with the result that it can be read precisely. The measuring device itself is mechanically very simply constructed. Finally there is the particular advantage that the non-linear resistance also to a large extent automatically balances the unavoidable fluctuation of battery voltage due to temperature influences and wear and tear. The drawing shows a preferred embodiment of the invention.

The light meter circuit shown in the drawing has a battery B as a source for current. The voltage U of battery B might be, for example, 1.35 volt. In series with battery B is photo-resistance FW which is illuminable with the light to be measured as indicated by the arrows A. The circuit also contains measuring device M which as a rule is constructed as a rotatable coil meter. The measuring device M indicates on scale S the current changes due to changes in illumination A falling on photo-resistance FW.

Since the resistance value of photo-resistance FW decreases in a nonlinearly manner with the logarithm of the increase in intensity of illumination, it would be necessary for scale S to have a very small division at low illumination values, which divisions become considerably bigger when illumination increases. To avoid this, the present invention co-ordinates a non-linear resistance with the circuit, with the result that the nonlinear change of the photo-resistance is balanced in such a manner that an at least approximate linear dependence between the logarithm of the increase in illumination intensity at the photo-resistance and the deflection of measuring device M is brought about. The preferred embodiment shown in the drawing shows diode D, preferably a germanium diode, which diode has a non-linear resistance and is connected in parallel to measuring device M. Diode D has the feature that its resistance decreases with increasing strength of current. The parallel connection of diode D with measuring device M is such that the logarithm of the increase in illumination A at photo-resistance FW although nonlinearly related to the increase in current through the battery B, is only linearly related to the increase of deflection of measuring device M. This means that scale S can have essentially linear, i.e. equal divisions, and accordingly is referred to as equilization.

In the circuit according to the preferred embodiment, very simple possibilities of equilization are additionally present. A suitable equilization resistance $R_1$ is connected in series with photo-resistance FW, which resistance serves for the purpose of equalization in the presence of high light intensity. Furthermore, for the purpose of equalization in medium and low light intensities, a matching network is provided which consists of additional resistances $R_2$ and $R_3$. Resistance $R_2$ is connected in parallel with the diode D while resistance $R_3$ is in series with the measuring device M. To facilitate the equalization, one or all resistances $R_1$, $R_2$ and $R_3$ can be adjustable. By selecting and/or adjusting of the resistances, it is possible to accomplish an excellent equalization in a very simple manner.

The resistance $R_1$ for equalization at high light intensities when photo-resistance FW has a small resistance value, is a relatively low resistance, while resistances $R_2$ and $R_3$ are relatively high resistances. In a particular embodiment, a ratio of resistances $R_1:R_2:R_3$ of about 3:50:100 was found to be particularly suitable. At a battery voltage $U=1.35$ v., the resistance values in said particular embodiment were about as follows: $R_1=300$ ohms, $R_2=5,000$ ohms and $R_3=10,000$ ohms.

The use of a diode in connection with the invention presents a certain difficulty insofar as the resistance of a diode depends not only on the strength of the current, but also on the temperature. The resistance of a diode decreases with rising temperature. A correct co-ordination of the meter deflection with the light intensity can therefore actually be brought about only for a definite diode temperature.

To escape this difficulty, the invention also provides a thermistor HL or similar heat variable resistance having a negative temperature coefficient for the purpose of compensating the temperature dependence of the diode resistance. The thermistor HL is suitably connected in series with measuring device M. A thermistor has the same temperature feature as a diode, i.e. its resistance value also decreases with an increase in temperature, and vice versa. Since in the particular embodiment shown, diode D lies parallel with and thermistor HL lies in series with measuring device M, temperature influences balance each other, so that the deflection at measuring device M is largely independent of the temperature of the environment.

A complete compensation for the temperature dependence of the diode resistance by means of a thermistor is impossible, however, because the diode resistance is less dependent on temperature, the greater the current is that flows through the diode, and vice versa. Such a dependence is not present in a thermistor. In the practical construction of a light meter, therefore, a thermistor can fully compensate for the temperature dependence of the diode only in the case of relatively high light intensity. In order to achieve an equalization in the case of low illumination intensity and correspondingly low currents, bimetal device Bi is co-ordinated with measuring device M, in addition to thermistor HL. The bimetal device shifts the zero point of the measuring device M by substantially the same amount for all light intensities, and therefore supports the thermistor effect at low light magnitudes especially effectively.

In order to limit the influence of the bimetal device to low light magnitudes and correspondingly small currents, the measuring device M can also be arranged in such a manner, for instance by non-linear field arrangement, that the zero point shift brought about by the bimetal device has a greater effect in the area of low light magnitudes than at higher magnitudes.

The invention is not restricted to the particular embodiment shown. The use of other non-linear resistances is fully contemplated which, depending on their characteristics, are connected into the circuit of measuring device M in such a manner that a linearization of the dependence of the measuring device deflection on the logarithm of the increase in light intensity at the photo-resistance FW will result. To bring about an equalization it would also be possible to replace a resistance of the aforementioned network by an appropriate zero point adjustment of measuring device M.

A particular advantage of the circuit shown is found in the fact that a battery test circuit can be provided which bridges the photo-resistance by a fixed resistance, but in other respects leaves the circuit unchanged. This means that any temperature influences will be compensated for even in testing the battery. In addition the battery is tested at high current magnitudes which correspond to the actual operating condition.

All features to be derived from the description and the drawing, including their constructive details and in any desired combination, can be considered inventive.

What is claimed is:
1. A light meter device comprising:
   a battery and a photo-conductive cell in series;
   a network connected to said battery and said photo-conductive cell and including a plurality of parallel branches therein;
   one of said parallel branches containing a meter and a first resistor connected across said battery and said photo-conductive cell;
   another of said parallel branches containing a non-linear resistance element therein connected in parallel to said meter and said first resistor;
   said first resistor comprising a thermistor for compensating for the temperature dependence of the non-linear resistance element; and
   said meter having a bimetallic biasing means for causing a zero-point shift of said meter at low light intensities despite the compensation by said thermistor.
2. A light meter device as defined in claim 1, wherein:
   said network includes a further parallel branch containing a second resistor therein, said second resistor being parallel to said nonlinear resistance element and also being parallel to said meter and said thermistor;
   a third resistor connected in said one parallel branch in series with said thermistor and said meter; and
   a fourth resistor connected in series with said photo-conductive cell and with said parallel branches.
3. A light meter as defined in claim 2, wherein the resistances of said fourth resistor, said second resistor and said third resistor are related to each other by the ratio 3:50:100.
4. A light meter device as defined in claim 1, wherein said nonlinear resistance element is a diode.

References Cited
UNITED STATES PATENTS

| | | | |
|---|---|---|---|
| 1,564,933 | 12/1925 | Brown | 324—105 X |
| 2,571,458 | 10/1951 | Lawrence et al. | 324—119 X |
| 2,648,254 | 8/1953 | Stimson et al. | 88—23 |
| 2,872,643 | 2/1959 | Rockwell | 324—119 |
| 3,005,915 | 10/1961 | White et al. | 250—214 |
| 3,028,499 | 4/1962 | Farrall | 88—23 X |
| 3,125,718 | 3/1964 | Race | 324—119 X |
| 3,147,680 | 9/1964 | Stimson | 88—23 X |
| 3,247,387 | 4/1966 | Doubek et al. | 324—119 X |

JEWELL H. PEDERSEN, *Primary Examiner.*

WARREN A. SKLAR, *Assistant Examiner.*